United States Patent [19]

Gilbert et al.

[11] 3,927,106

[45] Dec. 16, 1975

[54] PREPARATION OF TETRACHLOROCYCLO-HEXANONE

[75] Inventors: Eugene C. Gilbert, Hanover Park; Robert E. Jones, Arlington Heights; Donald C. McLean, Barrington, all of Ill.; Edward Sherman, Genoa City, Wis.

[73] Assignee: The Quaker Oats Company, Chicago, Ill.

[22] Filed: Mar. 4, 1974

[21] Appl. No.: 447,910

Related U.S. Application Data

[63] Continuation-in-part of Ser. No. 115,771, Feb. 16, 1971, abandoned.

[52] U.S. Cl............................................. 260/586 R
[51] Int. Cl.² ......................................... C07C 45/00

[58] Field of Search ................................. 260/586 R

[56] References Cited

FOREIGN PATENTS OR APPLICATIONS 773,967   7/1972   Belgium ............................. 260/586

*Primary Examiner*—Norman Morgenstern
*Attorney, Agent, or Firm*—Joseph P. O'Halloran

[57] ABSTRACT

Cyclohexanone, 2-chlorocyclohexanone, 2,2-dichlorocyclohexanone, 2,6-dichlorocyclohexanone, or 2,2,6-trichlorocyclohexanone is chlorinated under substantially anhydrous conditions to form 2,2,6,6-tetrachlorocyclohexanone in the presence of a catalyst.

13 Claims, No Drawings

PREPARATION OF TETRACHLOROCYCLO-HEXANONE

CROSS-REFERENCES TO RELATED APPLICATIONS

This application is a Continuation-in-Part of application U.S. Serial No. 115,771, filed Feb. 16, 1971 now abandoned.

BACKGROUND OF THE INVENTION

1. Field of the Invention

This invention relates to a method of producing a tetrachlorinated cyclic ketone.

More particularly this invention relates to a method of producing 2,2,6,6-tetrachlorocyclohexanone from cyclohexanone, 2-chlorocyclohexanone, 2,2-dichlorocyclohexanone, 2,6-dichlorocyclohexanone, and 2,2,6-trichlorocyclohexanone.

2. Description of the Prior Art

The 2,2,6,6-tetrachlorocyclohexanone is a known compound, the usefulness of which as a starting material for the production of 2,6-dichlorobenzonitrile, a known herbicide, is described in Belgium Pat. No. 647,497.

Hereinbefore 2,2,6,6-tetrachlorocyclohexanone has been prepared mainly from cyclohexanol. German Patent specification No. 823,449, published in 1951, describes that the reaction is performed with a yield of 60 percent when cyclohexanol is treated with chlorine while being exposed to ultraviolet light and, as the case may be, to organic peroxides. R. Riemschneider in Monatsheft fur Chemi, 85, 417 (1954), obtains a yield of 55 percent by slowly introducing chlorine into cyclohexanol at 5°C. to 10°C. and a yield of 25 percent when chlorine is rapidly introduced. U.S. Pat. No. 3,360,565 describes a method comprising reacting chlorine and cyclohexanol in the presence of an amine selected from the group consisting of aromatic, aliphatic, and heterocyclic hydrocarbylamines, and ethanolamine.

2,2,6,6-Tetrachlorocyclohexanone has been produced from cyclohexanone in the vapor phase, H. Britzinger and K. Orth in Monatsheft fur Chemie, 85, 1015-23 (1954) describe the tetrachlorination of cyclohexanone over $RhCl_3—Al_2O_3$ catalyst at between 130°C. and 150°C.

Up until now little success was had in the production of 2,2,6,6-tetrachlorocyclohexanone from cyclohexanone in the liquid phase. In order to avoid the danger of extensive polymer formation which is particularly prevalent when cyclohexanone is the starting material, experts have carried out the chlorination of this compound in water and in the presence of chalk as acid-binding material. Thereby 2-chlorocyclohexanone was obtained as defined material and even this in useful quantities only when very special reaction conditions were maintained. In addition to the 2-chlorocyclohexanone, only a very small fraction of higher chlorinated products was obtained.

We have now found that we can produce a good yield of 2,2,6,6-tetrachlorocyclohexanone from cyclohexanone in the liquid phase.

SUMMARY OF THE INVENTION

This invention provides a process for the preparation of 2,2,6,6-tetrachlorocyclohexanone which comprises contacting in the liquid phase and under substantially anhydrous conditions a mixture of chlorine and a substrate in the presence of a catalyst member selected from the group consisting of N-heteroaromatics, N-alkylpyrroles, alkyl substituted amide, alkyl substituted urea, tertiary alkyl amine, and salts thereof at a temperature between 60°C. or the temperature at which the reaction mixture is a liquid, whichever is higher, and 120°C.; said substrate being of the general formula:

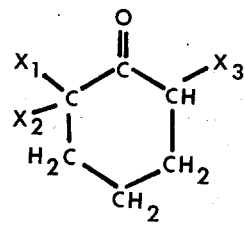

wherein $X_1$, $X_2$, and $X_3$ are selected from the group consisting of chlorine radicals and hydrogen radicals; said chlorine being in a ratio to said substrate of in excess of three molar equivalents based on the number of moles of said substrate minus one molar equivalent for each equivalent of said chlorine radicals in said substrate to one.

All of the above substrate except 2,2,6-trichlorocyclohexanone are prepared by well known processes. 2,2,6-Trichlorocyclohexanone is prepared at 25°C. to 30°C. by adding 475 grams of chlorine under substantially anhydrous conditions to 240 ml. of carbon tetrachloride and 196 grams of cyclohexanone. After complete addition of chlorine the mixture is concentrated on a rotary evaporator to strip off the carbon tetrachloride and dissolved chlorine and hydrogen chloride. The product containing 2,2,6-trichlorocyclohexanone weighs 385 grams.

Generally speaking, as used herein, the term N-heteroaromatic refers to cyclic compounds having one or more aromatic rings, and having one or more amine nitrogens in an aromatic ring. Generally speaking, as used hereinbefore, the term "alkyl-substituted N-heteroaromatic" refers to those N-heteroaromatics containing one or more amine nitrogens in the aromatic ring, and in which the alkyl substituent of the molecule has from one to ten carbons, preferably.

Suitable N-heteroaromatic catalysts for use in this invention include, for example:
pyridine
alkyl-substituted pyridines
quinoline
alkyl-substituted quinolines
isoquinoline
alkyl-substituted isoquinolines
pyrazine
pyrrole
N-alkylpyrrole
alkyl-substituted pyrazines
pyrimidine
alkyl-substituted pyrimidine Illustrative examples of alkyl-substituted pyridines suitable for use in accordance with this invention include the collidines, lutidines, and picolines, respectively which are the tri, di, and mono methyl substituted isomers. Illustrative examples of other alkyl-substituted pyridines which are satisfactory for use in accordance with the present invention include:

2-ethylpyridine
2-n-propylpyridine
2-n-butylpyridine
2-isobutylpyridine
2,4-diethylpyridine
2,4-di-n-propylpyridine
2-ethyl-4-propylpyridine
2-isobutyl-4-n-propylpyridine
2,4,6-triethylpyridine
2,4-diethylpyridine
2-benzylpyridine
2,4-dibenzylpyridine
2,4,6-tri-n-propylpyridine Illustrative examples of quinoline compounds which are satisfactory for use in accordance with the present invention include:
2-methylquinoline
2-ethylquinoline
2-n-propylquinoline
2,4-dimethylquinoline
2-methyl-4-ethylquinoline
2-n-butylquinoline
2,4-di-n-butylquinoline
2-isobutylquinoline Illustrative alkyl-substituted isoquinoline catalysts satisfactory for use in accordance with the present invention include:
1-methylisoquinoline
1-ethylisoquinoline
1-n-propylisoquinoline
1-n-butylisoquinoline
3-methylisoquinoline
3-n-propylisoquinoline
4-n-butylisoquinoline, and
4-isobutylisoquinoline, for example.

Preferred N-alkylpyrroles for use in accordance with this invention are those having -n-alkyl substituent with between 1 and 10 carbon atoms, inclusive.
N-methylpyrrole
N-ethylpyrrole
N-n-butylpyrrole, and
N-isobutylpyrrole, for example.

Illustrative pyrazine compounds which are satisfactory for use in accordance with the present invention include:
2-methylpyrazine
2-ethylpyrazine
2-propylpyrazine
2,3-dimethylpyrazine
2-methyl-3-propylpyrazine
2,3-dimethylpyrazine
2,3-diethylpyrazine
2,6-dimethylpyrazine
2,3,6-triethylpyrazine, and the like.

Illustrative alkyl-substituted pyrimidines for use in accordance with this invention include:
2-methylpyrimidine
2-ethylpyrimidine
4-methylpyrimidine
4-isobutylpyrimidine
2-methyl-4-isobutylpyrimidine, and the like.

As used herein, the term "alkyl-substituted amides" is intended to include those amides of carboxy acids having up to 10 carbon atoms in which the amide nitrogen atom also has two alkyl substituents attached thereto, and wherein the alkyl substitutents have up to 10 carbon atoms. Suitable alkyl substituted amides include, for example, N,N-dimethylacetamide, N,N-diethylacetamide, N,N-dimethylpropionamide, and N,N-diethylpropionamide. As used herein, the term "alkyl-substituted ureas" is intended to include those ureas having alkyl substituents containing up to 10 carbon atoms each. Suitable alkyl-substituted ureas include, for example, tetramethylurea, tetraethylurea, dimethyldiethylurea, monomethyltriethylurea, and trimethylethylurea.

As used herein, the term "tertiary alkyl amine" is intended to include those compounds having three alkyl or substituted alkyl groups attached to the amine nitrogen atom. Generally speaking, each of the substituents preferably has up to 10 carbon atoms. Suitable tertiary alkyl amines for use in this invention, for example, include tri-n-butylamine, trimethylamine, tripropylamine, and N,N-diethylbenzylamine.

It is to be understood that the nitrogen containing compounds referred to above are the catalysts which are useful in accordance with the present invention, and that the catalysts can be provided, in the reaction mixture, by adding as an ingredient to the reaction mixture either the catalyst, as such, or a salt of the nitrogen containing catalyst compound. Thus, the reaction may also be carried out in the presence of the acid salts of the above catalysts. Suitable acid salts include both inorganic acids such as the mineral acids, for example, and organic acids, such as, for example, carboxylic acids containing up to 10 carbon atoms, for example. Illustrative mineral acid salts contemplated for use in accordance with the present invention include the hydrochloric acid, and sulfuric acid salts, and other mineral acid salts, and illustrative organic acid salts include the acetic acid, propionic acid, and other organic acid salts as well.

The nature of the particular organic acid portion of the acid salt catalyst ingredient is of no substantial importance inasmuch as it is the nitrogen containing compound, or nitrogencontaining portion of the salt ingredient which serves as the catalyst. Moreover, copious quantities of hydrochloric acid are normally produced during the course of the reaction of the present invention, and it is to be understood that a substantial portion of the catalyst is present in the reaction mixture as the hydrochloric acid salt regardless of the particular ingredient which is used as the source of the catalyst.

Furthermore, it is to be understood that some of the catalyst itself may be chlorinated during the course of the reaction, and that some or all of the acid portion of the acid salt particularly the salts of the organic acids, may be chlorinated during the course of the reaction of the present invention. Chlorination of the catalyst or of the salt portion thereof does not destroy the efficacy of the catalyst in the method of the present invention.

The catalyst should be present in an amount of at least 0.1 percent by weight based on the weight of the cyclohexanone, and preferably in an amount between 0.5 and 5 percent by weight based on the weight of the cyclohexanone. More than 5 percent by weight of catalyst will not increase the yield of 2,2,6,6-tetrachlorocyclohexanone, but may effect the rate of reaction.

We have observed that most primary amines and their salts are not significantly effective as catalysts. We have also found that most N-substituted anilines and their salts are not significantly effective as catalysts. For example, t-butylamine and diethylaniline are not effective as catalysts.

The reaction is carried out in the liquid phase in the presence of an inert solvent, molten 2,2,6,6-tetrachlorocyclohexanone, or 2,2,6-trichlorocyclohexanone. Suitable inert solvents are members selected from the group consisting of inert saturated hydrocarbons, inert saturated chlorinated hydrocarbons, and saturated carboxylic acids. Suitable inert saturated hydrocarbons include for example hydrocarbons containing 5 to 10 carbon atoms such as pentane, hexamine, cyclohexane, octane, and decane. Suitable saturated halogenated hydrocarbons include for example aliphatic hydrocarbons containing 1 to 2 carbon atoms and 2 to 4 halogen atoms such as carbon tetrachloride, methylene dichloride, and tetrachloroethanes. Suitable saturated carboxylic acids include for example saturated aliphatic carboxylic acids containing from 2 to 5 carbon atoms such as acetic acid, propionic acid, and butanoic acid.

The reaction is preferably carried out in the presence of carbon tetrachloride, acetic acid, or molten 2,2,6,6-tetrachlorocyclohexanone and in the presence of collidine or collidine hydrochloride as a catalyst. With carbon tetrachloride or acetic acid and collidine hydrochloride yields up to 96 percent of theoretical have been obtained. In the presence of molten 2,2,6,6-tetrachlorocyclohexanone and collidine hydrochloride we have achieved yields better than 99 percent of theoretical.

The reaction is performed in the liquid phase at a temperature between 60°C. or the temperature at which the reaction mixture is a liquid, whichever is higher, and 120°C. The reaction is preferably carried out at a temperature between 75°C. or the temperature at which the reaction mixture is a liquid, whichever is higher, and 100°C. When the reaction is carried out in the presence of an inert solvent and the boiling temperature of the solvent is in the above range, the reaction is conveniently conducted at reflux.

When the reaction is carried out in the presence of molten 2,2,6,6-tetrachlorocyclohexanone, the reaction temperature is the melting point of 2,2,6,6-tetrachlorocyclohexanone depressed by the presence of the reactants and any impurities. The melting point of pure 2,2,6,6-tetrachlorocyclohexanone is 82°–83°C.

In carrying out the reaction, the reactants are contacted with one another conveniently by adding chlorine gas to the substrate in the presence of the catalyst under substantially anhydrous conditions and in the liquid phase. It is to be understood that by substantially anhydrous conditions we mean that no more than 1 percent by weight based on the weight of the substrate be present in the reaction mixture and preferably no more than 0.5 percent by weight of water.

To maximize the yield of tetrachlorocyclohexanone and minimize the side reaction products it is preferred that the contacting comprises continuously feeding the substrate and the chlorine into the inert solvent, molten 2,2,6,6-tetrachlorocyclohexanone, or 2,2,6-trichlorocyclohexanone containing the catalyst. The chlorine and the substrate must be in the ratio of at least four molar equivalents based on the number of moles of said substrate minus one molar equivalent for each equivalent of said chlorine radicals in said substrate to one molar equivalent of substrate when the reaction is in the presence of inert solvent or molten 2,2,6,6-tetrachlorocyclohexanone. If the reaction is carried out in the presence of 2,2,6-trichlorocyclohexanone, under the conditions of our process the 2,2,6-trichlorocyclohexanone is converted into 2,2,6,6-tetrachlorocyclohexanone. Therefore to maximize the yield of 2,2,6,6-tetrachlorocyclohexanone when the reaction is in the presence of 2,2,6-trichlorocyclohexanone, the chlorine and the substrate must be in the ratio of at least four molar equivalents based on the combination of the number of molar equivalents of the substrate and the number of molar equivalents of the 2,2,6-trichlorocyclohexanone minus one molar equivalent for each equivalent of chlorine radicals in the substrate and for each equivalent of chlorine radicals in the 2,2,6-trichlorocyclohexanone to one molar equivalent of the combination of said substrate and said 2,2,6-trichlorocyclohexanone. The minimum number of molar equivalents of chlorine to maximize the yield when the reaction is carried out in the presence of 2,2,6-trichlorocyclohexanone is calculated using the formula:

$$4(S+T)-RS-MT$$

wherein $S$ = number of molar equivalents of substrate;
$T$ = number of molar equivalents of 2,2,6-trichlorocyclohexanone;
$R$ = number of chlorine radicals in the substrate; and
$M$ = number of chlorine radicals in 2,2,6-trichlorocyclohexanone.

Thus, for example, if said substrate is one molar equivalent of 2,6-dichlorocyclohexanone and said reaction is in the presence of 0.25 molar equivalents of 2,2,6-trichlorocyclohexanone, the minimum number of molar equivalents to maximize the yield is 2.25 which is calculated using the formula:

$$4(1+0.25)-2(1)-3(0.25).$$

To maximize the yield of 2,2,6,6-tetrachlorocyclohexanone it is also preferred that after all the reactants have been contacted to hold the mixture at a temperature of about 75°C. or the temperature at which the reaction mixture is a liquid, whichever is higher, to about 90°C. for at least 30 minutes.

When the reaction is in the presence of inert solvents the desired product is separated from the reaction mixture by conventional procedures; most typically the reaction mixture is chilled and filtered to separate the product. Alternatively, the product may be separated by evaporating the solvent. When the reaction is in the presence of 2,2,6-trichlorocyclohexanone or molten 2,2,6,6-tetrachlorocyclohexanone ordinarily no separation is required as the product is relatively pure. The product of course contains catalyst whether the inert solvent is removed by filtration or evaporation from the product or when the reaction is in the presence of molten 2,2,6,6-tetrachlorocyclohexanone or 2,2,6-trichlorocyclohexanone but for many purposes no separation is required. When desired the product can be purified by conventional procedures, most typically, recrystallization.

DESCRIPTION OF THE PREFERRED EMBODIMENTS

The following preferred embodiments of the invention are shown for the purpose of illustrating the invention and demonstrating the best mode for practicing the invention. It will be apparent to those skilled in the art that various changes and modifications may be made therein without department from the spirit and scope of the invention as it is more precisely defined in the subjoined claims.

EXAMPLE 1

The following procedure was used: At 62°C. to 93°C., 355 grams of chlorine and 98 grams of distilled cyclohexanone were added to a mixture of 80 ml. of cyclohexane and 14.3 grams of collidine hydrochloride which mixture had been previously swept with nitrogen. The chlorine and the cyclohexanone were continuously fed into the cyclohexane containing the collidine hydrochloride over a period of two hours. The chlorine and the cyclohexanone were maintained in the ratio of 5 moles of chlorine to 1 mole of cyclohexanone throughout the reaction.

After the addition of chlorine and cyclohexanone was completed, the reaction mixture was maintained at 62°C. to 93°C. for thirty minutes. The solution was filtered hot after the addition of 500 ml. of n-hexane, and then allowed to cool. Upon cooling, crystals of 2,2,6,6-tetrachlorocyclohexanone formed. The crystals were separated from the solvent by filtration. The crystalline product was 80 percent of theoretical and had a melting point of 77°C. to 80°C. The product was found on analysis to be 96 percent by weight of 2,2,6,6-tetrachlorocyclohexanone and 4 percent by weight of 2,2,6-trichlorocyclohexanone.

Other representative examples of the present invention include the following, prepared in accordance with the foregoing teachings and example:

EXAMPLE 2

From 98 grams of cyclohexanone and 312 grams of chlorine in 400 ml. of acetic acid containing 13 grams of collidine hydrochloride, a product comprising 72 percent by weight of 2,2,6,6-tetrachlorocyclohexanone and 28 percent by weight of 2,2,6-trichlorocyclohexanone was obtained.

EXAMPLE 3

From 310 grams of cyclohexanone and 1120 grams of chlorine in 240 grams of carbon tetrachloride containing 25 grams of collidine hydrochloride, a product comprising 94 percent by weight of 2,2,6,6-tetrachlorocyclohexanone and 6 percent by weight of 2,2,6-trichlorocyclohexanone was obtained.

It is a purpose of Examples 4 through 6 to show that most primary amines and their salts are not significantly effective as catalysts. It is a further purpose to show that most N-substituted anilines and their salts are not significantly effective as catalysts.

The following examples were conducted in accordance with the teaching of Example 1.

EXAMPLE 4

From 98 grams of cyclohexanone and 355 grams of chlorine in 200 ml. of cyclohexane containing 10.4 grams of diethylaniline, a product was obtained which comprised 8 percent by weight of 2,2,6,6-tetrachlorocyclohexanone, 50 percent by weight of 2,2,6-trichlorocyclohexanone, and 41 percent by weight of 2,6-dichlorocyclohexanone.

EXAMPLE 5

From 98 grams of cyclohexanone and 355 grams of chlorine in 200 ml. of cyclohexane containing 7 grams of t-butylamine, a product was obtained which comprised 3 percent by weight of 2,2,6,6-tetrachlorocyclohexanone, 44 percent by weight of 2,2,6-trichlorocyclohexanone, and 49 percent by weight of 2,6-dichlorocyclohexanone.

EXAMPLE 6

From 98 grams of cyclohexanone and 355 grams of chlorine in 200 ml. carbon tetrachloride containing 10 grams of diethylaniline, a product was obtained which comprised 3 percent by weight of 2,2,6,6-tetrachlorocyclohexanone, 53 percent by weight of 2,2,6-trichlorocyclohexanone, and 43 percent by weight of 2,6-dichlorocyclohexanone.

EXAMPLE 7

The following procedure was used: At 80°C.–95°C., 1,300 grams of chlorine and 392 grams of distilled cyclohexanone were added to a mixture of 250 grams of 2,2,6,6-tetrachlorocyclohexanone and 16 grams of collidine hydrochloride which mixture had been previously swept with nitrogen. The chlorine and the cyclohexanone were continuously fed into the 2,2,6,6-tetrachlorocyclohexanone containing collidine hydrochloride over a period of eight hours. The chlorine and the cyclohexanone were maintained in the ratio of 4.5 moles of chlorine to 1 mole of cyclohexanone throughout the reaction.

After the addition of chlorine and cyclohexanone was completed, the reaction mixture was maintained at 80°C.–95°C. for two hours. The solution was filtered hot after the addition of 2,000 ml. of n-hexane, and then allowed to cool. Upon cooling, crystals of 2,2,6,6-tetrachlorocyclohexanone formed. The crystals were separated from the solvent by filtration. The crystalline product was 96 percent of theoretical and had a melting point of 81°–83°C. The product was found on analysis to be over 99 percent by weight of 2,2,6,6-tetrachlorocyclohexanone and less than 1 percent by weight of 2,2,6-trichlorocyclohexanone.

It is a purpose of Examples 8 through 10 to show that alkyl substituted amides, alkyl substituted ureas, as well as tertiary alkyl amines are effective as catalysts in our process.

EXAMPLE 8

Following the procedure of Example 7, from 1300 grams of chlorine and 392 grams of distilled cyclohexanone in 250 grams of 2,2,6,6-tetrachlorocyclohexanone containing 10.8 grams of N,N-dimethylacetamide a product was obtained which contained 81 percent by weight of 2,2,6,6-tetrachlorocyclohexanone, 12 percent by weight of 2,2,6-trichlorocyclohexanone, and 7 percent by weight of 2,6-dichlorocyclohexanone.

EXAMPLE 9

Following the procedure of Example 7, from 1,300 grams of chlorine and 392 grams of distilled cyclohexanone in 250 grams of 2,2,6,6-tetrachlorocyclohexanone containing 10 grams of tetramethylurea, a product was obtained which contained 94 percent by weight of 2,2,6,6-tetrachlorocyclohexanone and 6 percent by weight of 2,2,6-trichlorocyclohexanone.

EXAMPLE 10

Using the procedure of Example 7, from 1300 grams of chlorine and 392 grams of distilled cyclohexanone in 250 grams of 2,2,6,6-tetrachlorocyclohexanone containing 10 grams of tri-n-butylamine, a product was obtained which contained 72 percent by weight of 2,2,6,6-tetrachlorocyclohexanone, 26 percent by weight of 2,2,6-trichlorocyclohexanone, and 2 percent by weight of 2,6-dichlorocyclohexanone.

One of the purposes of Examples 11 through 14 is to show the effect of water on the yield of 2,2,6,6-tetrachlorocyclohexanone from cyclohexanone as compared with the effect of water on the yield of 2,2,6,6-tetrachlorocyclohexanone from cyclohexanol.

EXAMPLE 11

At 62°C. to 93°C. 355 grams of chlorine and 98 grams of cyclohexanone were added to a mixture of 80 ml. of carbon tetrachloride containing 14.2 grams of collidine and 8.3 ml. of water. The cyclohexanone was added to the carbon tetrachloride containing water and collidine and the chlorine was then bubbled into the mixture.

After the condition of the chlorine was completed, the reaction mixture was maintained at 62°C. to 93°C. for thirty minutes. The solution was filtered hot after the addition of 500 ml. of n-hexane, and then allowed to cool. Upon cooling, crystals of 2,2,6,6-tetrachlorocyclohexanone formed. The crystals were separated from the solvent by filtration. The crystalline product contained 62 percent by weight of 2,2,6,6-tetrachlorohexanone.

EXAMPLE 12

Following the procedure of Example 11, but omitting the water, a product was obtained which contained 92 percent by weight of 2,2,6,6-tetrachlorocyclohexanone.

EXAMPLE 13

Following the procedure of Example 11 but using 100 grams of cyclohexanol in place of the 98 grams of cyclohexanone and using 498 grams of chlorine, a product was obtained which contained 83 percent by weight of 2,2,6,6-tetrachlorocyclohexanone.

EXAMPLE 14

Following the procedure of Example 11 but using 100 grams of cyclohexanol in place of the 98 grams of cyclohexanone, omitting water, and using 426 grams of chlorine, a product was obtained which contained 67 percent by weight of 2,2,6,6-tetrachlorocyclohexanone.

It will be noted that Example 11 is not an embodiment of our invention since more than 1 percent by weight of water based on the weight of the cyclohexanone is present in the reaction mixture. Examples 13 and 14 are not embodiments of our invention since cyclohexanol is the substrate. Example 12 is an embodiment of the instant invention.

The above results are shown in tabular form in the table below and clearly demonstrate that water is deleterious to our process but beneficial to a process wherein the substrate is cyclohexanol:

| Ex. No. | Substrate (1 Mole) | Table Ml. Water | Grams Chlorine | Percent by weight of product which is 2,2,6,6-tetrachlorocyclohexanone |
|---|---|---|---|---|
| 11 | Cyclohexanone | 8.3 | 355 | 62 |
| 12 | Cyclohexanone | 0 | 355 | 92 |
| 13 | Cyclohexanol | 8.3 | 498 | 83 |
| 14 | Cyclohexanol | 0 | 426 | 67 |

The above tabulated results also clearly demonstrate that even with a greater than 1 mole excess of chlorine as in Example 13, the yield of product is poorer when cyclohexanol is the substrate than when cyclohexanone is chlorinated according to our process as in Example 12.

EXAMPLE 15

Following the procedure of Example 1 except substituting 1 mole of 2-chlorocyclohexanone as substrate, and using 250 grams of chlorine, a product was obtained which contained better than 90 percent by weight of 2,2,6,6-tetrachlorocyclohexanone.

EXAMPLE 16

Following the procedure of Example 1 except substituting 1 mole of a mixture of 2,2- and 2,6-dichlorocyclohexanone as substrate and using 180 grams of chlorine, a product was obtained which contained better than 90 percent by weight of 2,2,6,6-tetrachlorocyclohexanone.

EXAMPLE 17

Using the procedure of Example 1 except substituting 1 mole of 2,2,6-trichlorocyclohexanone for cyclohexanone, and using 100 grams of chlorine, a product which contained better than 90 percent by weight of 2,2,6,6-tetrachlorocyclohexanone was obtained.

From the foregoing description it is considered to be clear that the present invention contributes a substantial benefit to the art by providing a process for the preparation of 2,2,6,6-tetrachlorocyclohexanone from cyclohexanone.

We claim:

1. A process for the preparation of 2,2,6,6-tetrachlorocyclohexanone comprising contacting under substantially anhydrous conditions and in the liquid phase a mixture of chlorine and a substrate in the presence of a catalyst selected from the group consisting of collidines, pyridine, quinoline, lutidines, picolines, pyrazine, N,N-dimethylacetamide, N,N-diethylacetamide, N,N-dimethylpropionamide, N,N-diethylpropionamide, tetramethylurea, tetraethylurea, dimethyldiethylurea, monomethyltriethylurea, trimethylethylurea, tri-n-butylamine, trimethylamine, tripropylamine, and the hydrochloric acid and acetic acid salts of the aforementioned amines at a temperature between 60°C. or the temperature at which the reaction mixture is a liquid, whichever is higher, and 120°C.; said substrate being of the general formula:

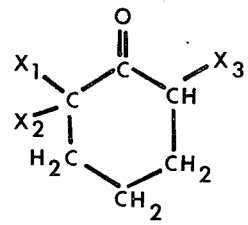

wherein $X_1$, $X_2$, and $X_3$ are selected from the group consisting of chlorine radicals and hydrogen radicals; said chlorine being in a ratio to said substrate of in excess of three molar equivalents based on the number of moles of said substrate minus one molar equivalent for each equivalent of said chlorine radicals in said substrate to one.

2. The process as in claim 1 wherein said contacting is at a temperature of about 75°C. or the temperature at which the reaction mixture is a liquid, whichever, is higher, to about 100°C.

3. The process as in claim 1 which further comprises holding said mixture at a temperature of about 75°C. or the temperature at which the reaction mixture is a liquid, whichever is higher, to about 90°C. for at least 30 minutes.

4. The process as in claim 1 wherein said contacting is in the presence of an inert solvent selected from the group consisting of saturated hydrocarbons, saturated halogenated hydrocarbons, alkanoic acids and mixtures thereof.

5. The process as in claim 4 wherein said solvent is carbon tetrachloride.

6. The process as in claim 4 wherein said solvent is cyclohexane.

7. The process as in claim 4 wherein said solvent is acetic acid.

8. The process as in claim 4 wherein said contacting comprises continuously feeding said substrate and said chlorine into said inert solvent in a ratio of at least four molar equivalents based on the number of moles of said substrate minus one molar equivalent for each equivalent of said chlorine radicals in said substrate to one, whereby the yield of said 2,2,6,6-tetrachlorocyclohexanone is maximized.

9. The process as in claim 1 wherein said contacting is in the presence of molten 2,2,6,6-tetrachlorocyclohexanone.

10. The process as in claim 9 wherein said contacting comprises continuously feeding said substrate and said chlorine into said molten 2,2,6,6-tetrachlorocyclohexanone in a ratio of at least four molar equivalents based on the number of moles of said substrate minus one molar equivalent for each equivalent of said chlorine radicals in said substrate to one, whereby the yield of said 2,2,6,6-tetrachlorocyclohexanone is maximized.

11. The process as in claim 1 wherein said contacting is in the presence of 2,2,6-trichlorocyclohexanone, said 2,2,6-trichlorocyclohexanone, forming part of said substrate.

12. The process as in claim 11 wherein said contacting comprises continuously feeding said substrate and said chlorine into said 2,2,6-trichlorocyclohexanone which forms part of said substrate in a ratio of at least four molar equivalents based on the number of moles of said substrate minus one molar equivalent for each equivalent of said chlorine radicals in said substrate to one, whereby the yield of said 2,2,6,6-tetrachlorocyclohexanone is maximized.

13. A process for the preparation of 2,2,6,6-tetrachlorocyclohexanone comprising contacting under substantially anhydrous conditions and in the liquid phase a mixture of chlorine and a substrate in the presence of a catalyst member selected from the group consisting of collidine and collidine hydrochloride at a temperature between 60°C. or the temperature at which the reaction mixture is a liquid, whichever is higher, and 120°C.; said substrate being of the general formula:

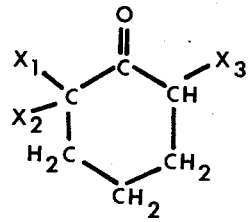

wherein $X_1$, $X_2$, and $X_3$ are selected from the group consisting of chlorine radicals and hydrogen radicals; said chlorine being in a ratio to said substrate of in excess of three molar equivalents based on the number of moles of said substrate minus one molar equivalent for each equivalent of said chlorine radicals in said substrate to one.

* * * * *

UNITED STATES PATENT OFFICE
CERTIFICATE OF CORRECTION

PATENT NO. : 3,927,106
DATED : December 16, 1975
INVENTOR(S) : Gene C. Gilbert, Robert E. Jones, Donald C. McLean and Edward Sherman It is certified that error appears in the above-identified patent and that said Letters Patent are hereby corrected as shown below:

Column 2, line 30 "25°C." should read --15°C.--.

In Example 11, at column 9, line 15 "condition" should read --addition--.

Signed and Sealed this eighteenth Day of May 1976

[SEAL]

Attest:

RUTH C. MASON
Attesting Officer

C. MARSHALL DANN
Commissioner of Patents and Trademarks